(12) United States Patent
Ahn et al.

(10) Patent No.: US 11,602,972 B1
(45) Date of Patent: Mar. 14, 2023

(54) MULTIFUNCTIONAL CONTROL FOR A SYSTEM IN A VEHICLE

(71) Applicant: GM Global Technology Operations LLC, Detroit, MI (US)

(72) Inventors: Ki Hyun Ahn, Lake Orion, MI (US); Joseph F. Szczerba, Grand Blanc, MI (US); Akilesh Rajavenkatanarayanan, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/732,055

(22) Filed: Apr. 28, 2022

(51) Int. Cl.
*B60H 1/00* (2006.01)
*G06F 3/03* (2006.01)
*G05G 1/02* (2006.01)
*G05G 1/08* (2006.01)
*G06F 3/0362* (2013.01)
*G05G 1/01* (2008.04)
*G05G 1/10* (2006.01)
*G05G 25/00* (2006.01)
*G05G 1/04* (2006.01)

(52) U.S. Cl.
CPC .......... *B60H 1/0065* (2013.01); *G05G 1/01* (2013.01); *G05G 1/025* (2013.01); *G05G 1/04* (2013.01); *G05G 1/08* (2013.01); *G05G 1/10* (2013.01); *G05G 25/00* (2013.01); *G06F 3/0362* (2013.01); *G05G 2700/32* (2013.01)

(58) Field of Classification Search
CPC .......... G05G 1/01; G05G 1/025; G05G 1/04; G05G 1/08; G05G 1/10; G05G 25/00; G05G 2700/32; B60H 1/0065; G06F 3/0362
See application file for complete search history.

(56) References Cited

U.S. PATENT DOCUMENTS

| 2,731,805 | A | * | 1/1956 | Kuhn | B60H 1/0065 62/243 |
|---|---|---|---|---|---|
| 8,198,555 | B2 | * | 6/2012 | Baker | H01H 25/041 200/11 R |
| 9,459,787 | B2 | * | 10/2016 | Kulczycki | G06F 3/03547 |
| 9,959,998 | B2 | * | 5/2018 | Hisada | H01H 25/041 |
| 10,234,968 | B2 | * | 3/2019 | Brown | G06F 3/0412 |
| 2007/0057915 | A1 | * | 3/2007 | Yamauchi | G01C 21/3664 345/156 |

FOREIGN PATENT DOCUMENTS

| DE | 102013012326 A1 * | 1/2015 | .......... B60H 1/0065 |
|---|---|---|---|
| FR | 2847355 A1 * | 5/2004 | ......... B60H 1/00985 |

* cited by examiner

*Primary Examiner* — Adam D Rogers
(74) *Attorney, Agent, or Firm* — Vivacqua Crane, PLLC (57) ABSTRACT

A multi-functional control, a control system, and a method of controlling a system in a vehicle. The multi-functional control includes a base plate, a post extending through a slot in the base plate, and at least two stacked knobs, rotatably and tilt-ably attached to the post. The stacked knobs include a display knob and a base knob. The multi-functional control further includes a plurality of sensors. The sensors include a first touch sensor integrated in the display knob, a second touch sensor integrated in the base knob, a first rotary sensor integrated in the display knob, a second rotary sensor integrated in the base knob, a rocker switch connected to the stacked knobs, and a push-button switch connected to the stacked knobs. The multi-functional control also includes a sliding sensor. The post and stacked knobs are mounted to the sliding sensor.

20 Claims, 5 Drawing Sheets

MULTIFUNCTIONAL CONTROL FOR A SYSTEM IN A VEHICLE

INTRODUCTION

Numerous controls are found throughout the cabin of a vehicle. The controls may include, but are not limited to switches, buttons, toggles, and dials. A significant portion of these controls may be found, for example, in the center console and are used to adjust various features related to vehicle operation, infotainment systems, and HVAC control. Another portion of the controls are for seat positioning and are often located at the base of the seat. Further, there are various controls for operating windows and locks that commonly located in the armrests or otherwise positioned on the doors.

As the number of features within a vehicle increase, so do the number of controls. However, with an increase in the number of controls, the more space the controls occupy, making it difficult to accommodate all of the controls through the cabin of the vehicle, particularly in the center console. Further, as the number of controls increase, the complexity of interacting with the controls increases and a greater difficulty in discerning the various controls may arise.

Thus, while current controls achieve their intended purpose, there is a need for a new and improved controls that reduce packaging size, provide an increase in functionality, and reduce complexity in use.

SUMMARY

Aspects of the present disclosure are directed to a multi-functional control for a vehicle. The multi-functional control includes a base plate including a slot, a post extending through the slot in the base plate, and at least two stacked knobs, rotatably and tilt-ably attached to the post. The stacked knobs include a display knob and a base knob. The multi-functional control further includes a plurality of sensors. The plurality of sensors includes a first touch sensor integrated in the display knob, a second touch sensor integrated in the base knob, a first rotary sensor integrated in the display knob, a second rotary sensor integrated in the base knob, a rocker switch connected to the stacked knobs, and a push-button switch connected to the stacked knobs. The multi-functional control includes a sliding sensor, wherein the post and stacked knobs are mounted to the sliding sensor.

In aspects, the multi-functional control further includes an on-board processor connected to the multi-functional control and a plurality of devices connected to the on-board processor.

In further aspects, the multi-functional control includes a system controller connecting the plurality of devices to the on-board processor.

In further aspects, the multi-functional control includes an independently packaged control connected to the on-board processor.

In yet further aspects, the plurality of devices includes a heater, an air conditioner, a fan, and a blend door motor.

In yet further aspects, the multi-functional control includes an air duct fluidly connected to a vehicle cabin including the multi-functional control. The plurality of devices is operatively coupled to the duct.

In yet further aspects, a temperature sensor is connected to the on-board processor, wherein the temperature sensor is operatively coupled to the cabin.

In any of the above aspects, an independently packaged control is connected to the on-board processor.

In any of the above aspects, the first touch sensor and the second touch sensor each include at least one of a capacitive sensor and a resistive sensor.

In any of the above aspects, the first rotary sensor and the second rotary sensor each include at least one of a rotary potentiometer and a rotary encoder.

In any of the above aspects, the sliding sensor includes at least one of a slide potentiometer and a linear variable differential transformer.

In any of the above aspects, the display knob includes a display.

Further aspects of the present disclosure are directed to a control system for a vehicle. The control system includes a multi-functional control and an on-board processor. The multi-functional control includes a base plate including a slot, a post extending through the slot in the base plate, at least two stacked knobs, rotatably and tilt-ably attached to the post, wherein the stacked knobs include a display knob and a base knob, a plurality of sensors including a first touch sensor integrated in the display knob, a second touch sensor integrated in the base knob, a first rotary sensor integrated in the display knob, a second rotary sensor integrated in the base knob, a rocker switch connected to the stacked knobs, and a push-button switch connected to the stacked knobs, and a sliding sensor, wherein the post and stacked knobs are mounted to the sliding sensor. The on-board processor is in communication with the plurality of sensors and is configured to: detect a manipulation of the multi-functional control by at least one of the plurality of sensors, and adjust one of a plurality of devices associated with the detected manipulation of the multi-functional control.

In aspects, the control system further includes an independently packaged switch. The on-board processor is configured to determine a state of the switch and adjust at least a portion of the plurality of devices the manipulation of the multi-functional control is associated with.

Yet additional aspects of the present disclosure are directed to a method of controlling a system in a vehicle. The method includes detecting by at least one of a plurality of sensors a manipulation of a multi-functional control. The multi-functional control includes a base plate including a slot, a post extending through the slot in the base plate, at least two stacked knobs, rotatably and tilt-ably attached to the post, wherein the stacked knobs include a display knob, a base knob, and a plurality of sensors including a first touch sensor integrated in the display knob, a second touch sensor integrated in the base knob, a first rotary sensor integrated in the display knob, a second rotary sensor integrated in the base knob, a rocker switch connected to the stacked knobs, and a push-button switch connected to the stacked knobs, and a sliding sensor, wherein the sliding sensor is one of the plurality of sensors and wherein the post and stacked knobs are mounted to the sliding sensor. The method further includes adjusting one of a plurality of devices in a system based on the detected manipulation of the multi-functional control.

In aspects, the method further includes identifying which of the display knob and base knob are being rotated.

In additional aspects, the method further includes determining both the display knob and the base knob are being manipulated and assigning the manipulation to the base knob.

In additional aspects, the method further includes detecting tilting of the stacked knobs to activate the rocker switch.

In additional aspects, the method further includes detecting a state of the push-button switch.

In any of the above aspects, the system is an HVAC system and the plurality of devices include a heater, an air conditioner, a blower motor, an actuator and adjusting one of a plurality of devices includes adjusting one of the heater, the air conditioner, the blower motor, and the actuator.

BRIEF DESCRIPTION OF THE DRAWINGS

The drawings described herein are for illustration purposes only and are not intended to limit the scope of the present disclosure in any way.

DETAILED DESCRIPTION

The present disclosure is directed to a multi-functional HVAC control. A control is understood as an electro-mechanical input device, such as a switch, button, toggle, dial, etc., that is associated with one or more devices, adjusted to achieve a particular outcome. For example, a temperature control is adjusted to alter the operating settings of a heater or air conditioner to warm or cool air circulated through a vehicle cabin. The multifunctional control described herein offers a reduction in the number of independently packaged HVAC controls, reduces footprint, increases functionality, and reduces complexity of use. The controls may also be used for controlling other vehicle features, such as the infotainment system controls or seat positioning controls.

Figure 1:
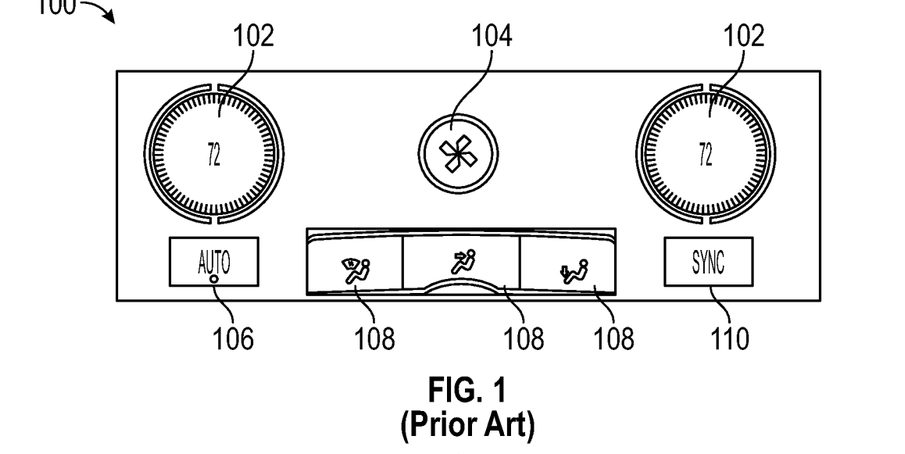
FIG. 1 illustrates a number of independently packaged controls for controlling an HVAC system.

FIG. 1 illustrates an HVAC control panel 100 including a number of individually packaged controls, which are manipulated to adjust setpoints and control the various devices that constitute the HVAC system. In the illustrated aspect, the controls include temperature controls 102 for the driver and passenger, fan speed controls 104, automatic temperature regulation controls 106, directional air flow controls 108, and a sync control 110 that syncs the temperature controls 102 and, in particular aspects, synchronizes at least one of the passenger side temperature and air flow controls to at least one of the driver side temperature and air flow controls. These controls occupy a relatively significant amount of space in the center console.

Figure 2A:
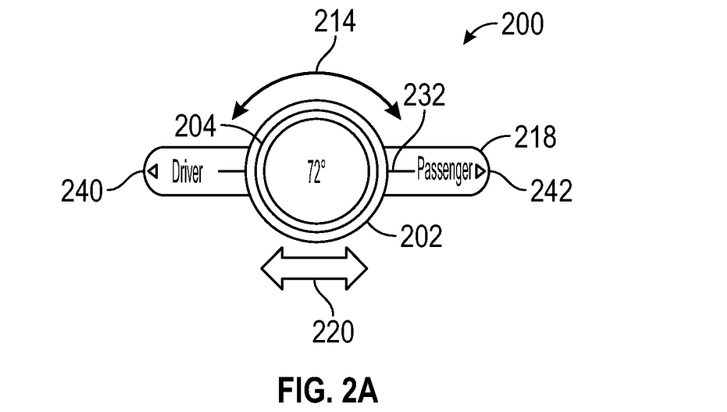
FIG. 2A illustrates a multi-functional HVAC control according to an aspect of the present disclosure.
Figures 2B, 2C:
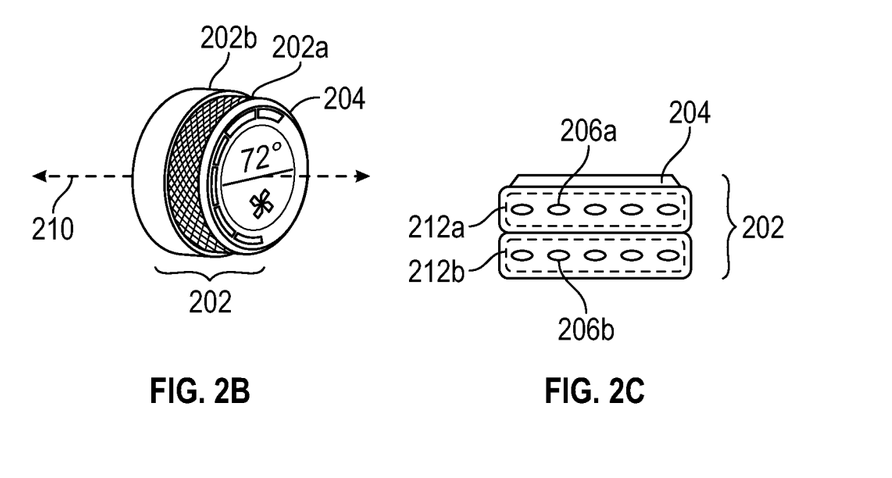
FIG. 2B illustrates a perspective stacked knobs of a multi-functional HVAC control according to an aspect of the present disclosure.
FIG. 2C illustrates a side view of the stacked knobs according to an aspect of the present disclosure.

FIGS. 2A through 2C illustrate an aspect of a multi-functional control 200, which occupy a relatively small amount of space on the center console as compared to the HVAC control panel 100 of FIG. 1. The multi-functional control 200 includes at least two stacked knobs 202, wherein each knob 202a, 202b controls a separate device setpoint, such as temperature and air speed. The stacked knobs 202 include a display knob 202a stacked over a base knob 202b. The display knob 202a includes display 204 that illustrates information relating to a given setpoint being adjusted with the manipulation of the multi-functional control 200. For example, if temperature is being adjusted, the adjustment in the temperature setpoint will be shown on the display 204. The display 204 may include, for example, a light emitting diode display.

Each stacked knob 202a, 202b includes a touch sensor 206a, 206b around the periphery of the stacked knob 202. The touch sensors 206a, 206b may be, for example, a capacitive sensor or a resistive sensor. When one of the stacked knobs 202a, 202b is grasped and adjusted, the corresponding touch sensor 206a, 206b detects the interaction and the display 204 provides information regarding the setpoints correlating to the stacked knob 202a, 202b that has been adjusted by the user. If both stacked knobs 202 detect an interaction, then an assumption is made by the on-board processor, described further herein, that the user intended to interact with the base knob 202b.

Figure 3A:
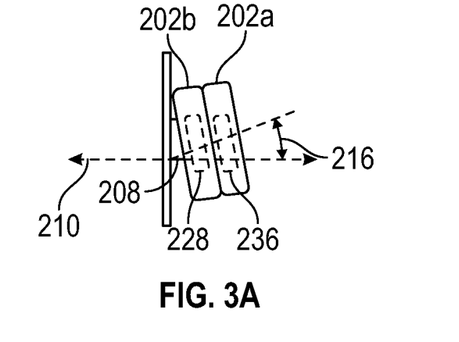
FIG. 3A illustrates a side view of the stacked knobs according to an aspect of the present disclosure, wherein the tilting knobs are pivoted in the upward direction.
Figure 3B:
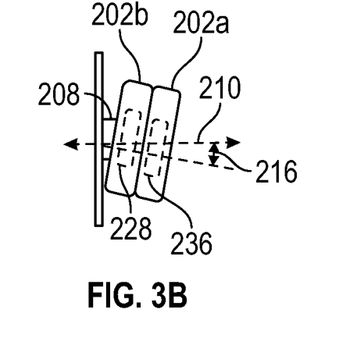
FIG. 3B illustrates a side view of the stacked knobs according to an aspect of the present disclosure, wherein the tilting knobs are pivoted in the downward direction.

The stacked knobs 202 are mounted on a post 208, illustrated in FIGS. 3A and 3B, in a rotatable manner in direction 214, wherein each stacked knob 202a, 202b is independently rotatable in direction 214 relative to the other stacked knob 202a, 202b as well as relative to an axis 210 defined by the post 208. A first rotary sensor 212a is incorporated in the display knob 202a and a second rotary sensor 212b is incorporated in the base knob 202b and the rotation of the stacked knobs 202 adjusts the setpoints that each stacked knob 202a, 202b is associated with. The rotary sensors 212a, 212b may include, e.g., potentiometers or rotary encoders. The greater the rotation of each of the stacked knobs 202a, 202b, the greater the alteration in the setpoint corresponding to each stacked knob 202a, 202b. In aspects, rotation of the display knob 202a adjusts the temperature set point and rotation of the base knob 202b adjusts the fan speed set point, or vice versa. Further, in any of the above aspects, the stacked knobs 202 include detents to provide a tactile indicator of the degree to which a given stacked knob 202a, 202b is being rotated and adjusted.

Further, as illustrated in FIGS. 3A and 3B, the stacked knobs 202 are connected to a rocker switch 228 on the end of the post 208, wherein the stacked knobs 202 are tiltable in an angle 216 in a first direction and a second direction opposite the first direction, relative to the axis 210. The stacked knobs 202 may provide, for example, a three-way rocker switch 228. The tilting of the stacked knobs 202 in the rocker switch 228 controls yet another setpoint, such as the direction of air flow, wherein movement of the stacked knobs 202 upwards results in moving airflow towards the roof of the vehicle cabin and movement of the stacked knobs 202 downwards results in moving airflow towards the floor of the vehicle cabin. As the stacked knobs 202 are adjusted activating the rocker switch 228, the duration of the adjustment or the number of adjustments in a particular direction, may alter the degree to which the airflow is directed in a particular direction. For example, if the stacked knobs 202 and rocker switch 228 are tilted up for a count of four or more seconds, or pushed in an upwards direction four times, the air flow may transition from the floor to the floor and center console on the first adjustment, then to the center console on the second adjustment, then to the center console and towards the roof in the third adjustment, and then towards the cabin roof in the fourth adjustment. Again, the display 204 may show the adjustment in the direction setpoint on activation of the rocker switch 228.

In addition, the stacked knobs 202 are connected to a push-button switch 236. The push-button switch 236 is activated by the pressing on the stacked knobs 202 in the direction of axis 210. As illustrated, the stacked knobs 202 encase the push-button switch 236 which is activated by pressing the display 204. Alternatively, the push-button switch 236 is integrated into the post 208 or integrated into the neutral position of a three-way rocker switch. The pressing of the push-button switch 236 allows for the adjustment of an additional setpoint, such as placing the HVAC system into auto-mode where the system controls the various devices associated with the system to achieve a particular temperature setpoint. In alternative aspects, pressing of the push-button switch 236 sets the system to sync, wherein all of the zones are set to the setpoints used in the front, driver's side zone. Again, the pressing of the push-button switch 236 may display an icon, such as the auto-mode or sync icon, on the display 204 when activated.

Figure 4A:
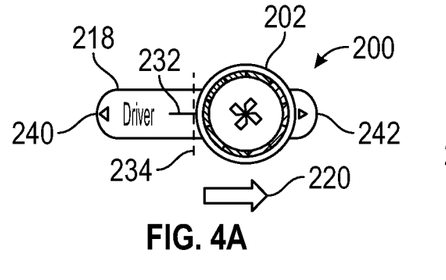
FIG. 4A illustrates the sliding sensor according to an aspect of the present disclosure.
Figure 4B:
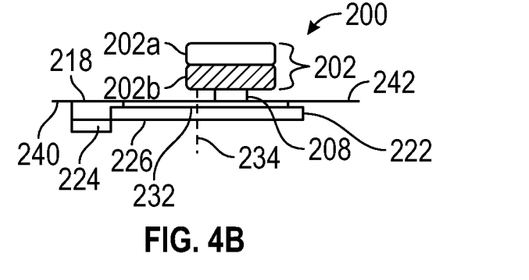
FIG. 4B illustrates a bottom view of the sliding sensor according to an aspect of the present disclosure.
Figure 4C:
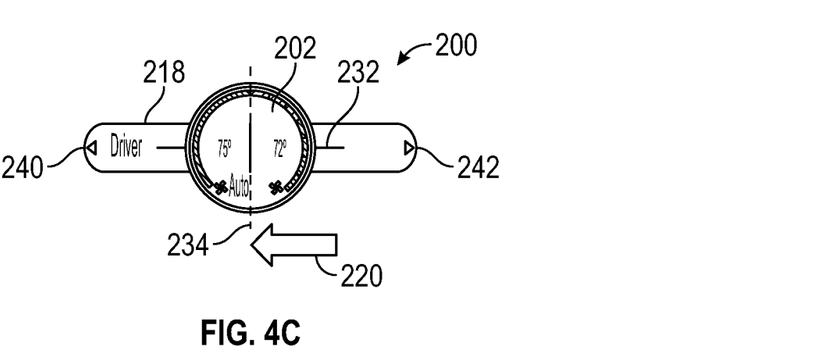
FIG. 4C illustrates a further aspect of a sliding sensor according to the present disclosure.

Further, the post 208 is mounted to a sliding sensor 222 and extends from a slot 232 in a base plate 218, as illustrated in FIGS. 4A through 4C. The stacked knobs 202 and post 208 are slid back and forth in direction 220. The sliding sensor 222 may include a slide potentiometer or a linear variable differential transformer. The sliding sensor 222 controls one or more additional set points or selectively applies the setpoints being adjusted by manipulation of the stacked knobs 202. Manipulation, as referenced herein, is understood herein as a user interaction with the multi-functional control 200, such as rotation, tilting, pressing the controls described herein. These adjustments are also illustrated on the display 204 when the sliding sensor 222 is activated, i.e., the post 208 is moved in direction 220 from the center 234 of the sliding sensor 222. For example, depending on the position the post 208 is moved to, towards the driver's side 240 to the passenger side 242, the sliding sensor 222 may selectively apply adjustments in the setpoints adjusted by the stacked knobs 202 described above (temperature, fan speed, airflow direction) to one of the driver's side, the passenger's side, or both the driver's side and the passenger's side of the vehicle cabin.

In aspects, the sliding sensor 222 is motorized to return the post 208 to the center 234 of the sliding sensor 222 after a selected time period. In aspects, the selected time period may be immediately upon release of the stacked knobs 202 as detected by the touch sensors 206a, 206b and up to 30 seconds after release of the stacked knobs 202 as detected by the touch sensors 206a, 206b. As mentioned above, the sliding sensor 222 may include a motor 224 and pulleys 226, for example, to return the stacked knobs 202 back to the center of the sliding sensor 222. The speed of return of the stacked knobs 202 to the center of the sliding sensor 222 may be adjusted by adjusting the motor speed.

Figure 5:
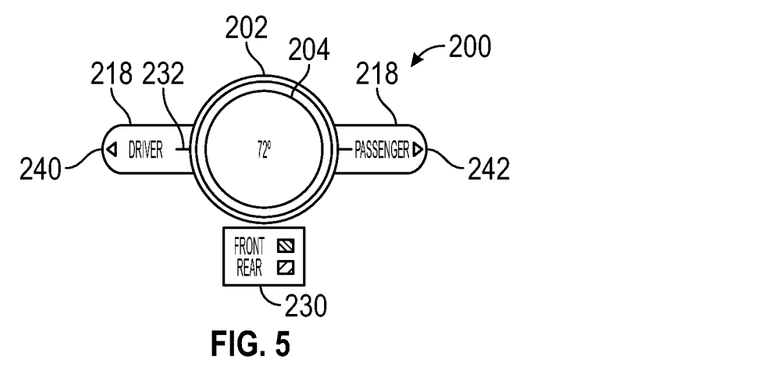
FIG. 5 illustrates a multi-function control in combination with an independently packaged control according to an aspect of the present disclosure.

In optional aspects, independently packaged controls, such as independently packaged control 230 illustrated in FIG. 5, may be combined with the multi-functional control 200. The independently packaged control 230 is, in aspects, a two-way or three-way switch, including a toggle switch, rocker switch, button, knob, etc. In aspects, the independently packaged control 230 may alter which of the plurality of devices 334 the manipulation of the multi-functional control 200 is applied to. For example, when the individually packaged control 230 is in a first position, the manipulation of the stacked knobs 202 controls the front zone of a vehicle, whereas in a second position, the manipulation of the stacked knobs 202 controls the rear zone of a vehicle. In such a manner, different actuators may be triggered depending on which state the individually packaged control 230 is in. In alternative aspects, when the independently packaged control 230 is in a first position, the multi-functional control 200 controls the HVAC system and in a second position, the multi-functional control controls the infotainment system.

Figure 6:
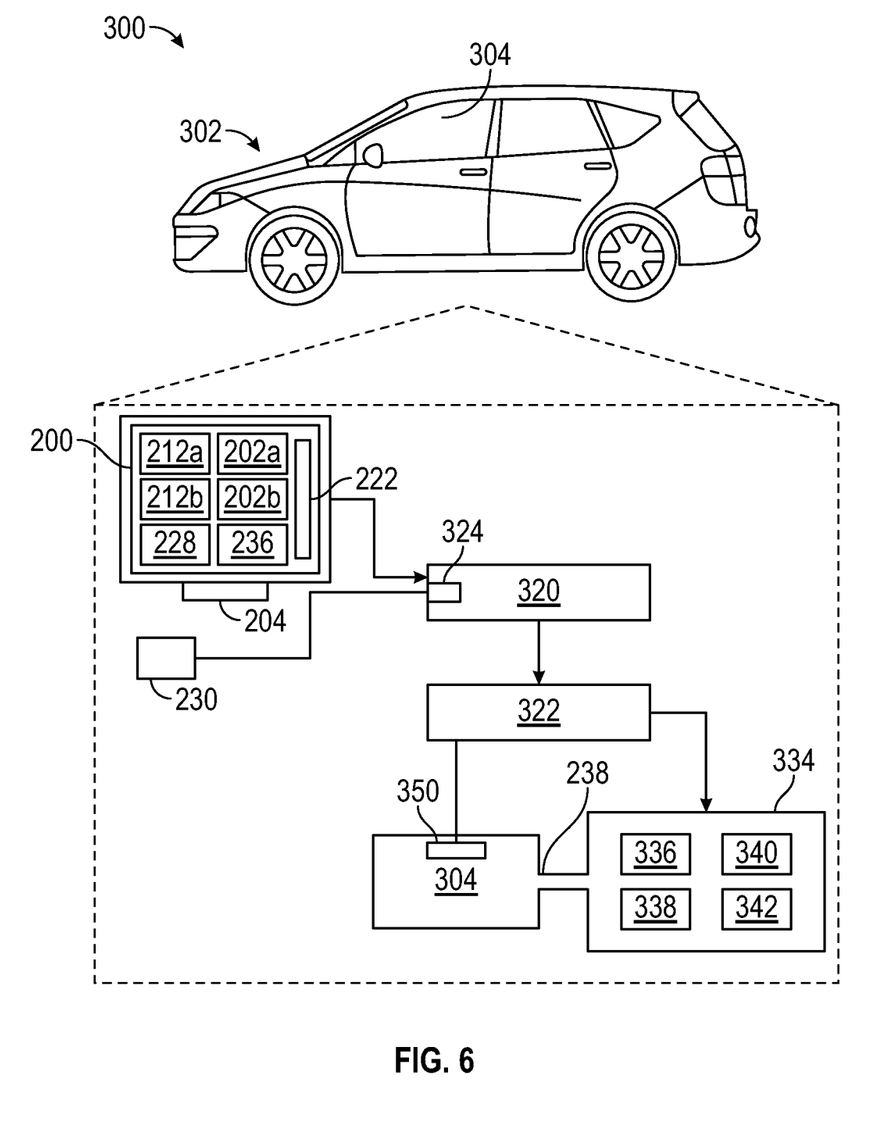
FIG. 6 illustrates a system incorporating a multi-functional controller according to an aspect the present disclosure.

The multi-functional control 200 and optional independently packaged control 230 form part of a control system 300 as illustrated in FIG. 6, for a vehicle 302. Generally, the system 300 includes a vehicle 302, a multi-functional control 200 as described in the aspects above, an independently packaged control 230 as described in the aspects above, an on-board processor 320, a system controller 322, and a plurality of devices 334. The vehicle 302 includes a cabin 304 for carrying passengers, within the cabin is at least one multi-functional control 200 including controls for various functionalities. Within the cabin 304 is a multi-functional control 200 and, in aspects, at least one independently packaged control 230 associated with the multi-functional control 200. In addition, an air duct 238 is fluidly connected to the cabin 304 to provide air, either recycled from the cabin 304 or fresh air, into the cabin 304. Fluidly connected is understood here as allowing air, gas or other flowable material to flow from the air duct 238 into the cabin 304 and, in aspects, vice versa.

The multi-functional control 200 is connected to the on-board processor 320 to transfer a signal, representing an adjustment detected by at least one of the plurality of sensors associated with the multi-functional control, wherein the plurality of sensors includes, e.g., the touch sensors 206a, 206b, rotary sensor 212a, 212b, and sliding sensor 222 as well as information received from the rocker switch 228, and the push button switch 236. Further information is communicated in the form of signals from the on-board processor 320 to the display 204 to provide an indication of the parameter being adjusted. In addition, the independently packaged control 230 is also connected to the on-board processor 320 and sends a signal to the independently packaged control 230 to adjust which parameters and corresponding devices 334 are being adjusted.

The on-board processor 320 may include a custom made or commercially available processor, a central processing unit (CPU), a graphics processing unit (GPU), an auxiliary processor among several processors associated with the on-board processor 320, a semiconductor-based microprocessor (in the form of a microchip or a chip set), a microprocessor, a combination thereof, or generally a device for executing instructions. In aspects, more than one on-board processor 320 may be present, wherein processing may be distributed across the multiple on-board processor 320. The on-board processor 320 being configured to perform the methods of controlling a system in a vehicle described herein.

In aspects, the on-board processor 320 is connected to a system controller 322. In alternative aspects, the system controller 322 is integrated with the on-board processor 320.

The on-board processor 320 detects that the multi-functional control 200 has been manipulated based on the signals received from the sensors in the multi-functional control 200. Depending on the sensor, it may be necessary to cross-reference the signals received from the sensors to determine the degree of the adjustment (such as in the case of the rotary sensors 212a, 212b) and communicate this information in the form of one or more signals to the system controller 322. The system controller 322 in turn controls the plurality of devices 334 associated with the sensors in the multi-functional control.

Further, the on-board processor 320 includes a video processor 324 that is connected to the display 204. The video processor 324, based on the detected signals communicated to the on-board processor 320 by the sensors in the multi-functional control 200, instructs the display 204, in the form of signals, to provide a visual indication of the intended output. For example, for a temperature adjustment detected by the rotation of the display knob 202a, the display 204 may provide an indication of the desired temperature setpoint as illustrated in FIG. 2.

Where the multi-functional control 200 is for HVAC, the system controller 322 controls a plurality of devices 334 associated with the HVAC system and utilizes the information provided to the on-board processor regarding the various selected setpoints to control the plurality of devices 334 in the HVAC system. The plurality of devices 334 are operatively coupled to the air duct 238 wherein the plurality of devices 334 are connected in a manner in which the plurality of devices 334 can alter or otherwise affect a characteristic of the air passing through the air duct 238, such as changing the temperature, humidity levels, speed, or direction of the air. The devices 334 include, for example, a heater 336, an air conditioner 338, a blower motor 340, actuators such as a blend door motor 342, etc. In addition, one or more temperature sensors 350 located within the cabin 304 and connected to the system controller 322 may be used to determine and regulate the temperature within the cabin 304. The outputs of the system 300 result in alterations of temperature, blower motor, actuators for controlling each zone, auto-control of the HVAC system, syncing of the zones, and altering of the airflow direction among others.

Figure 7:
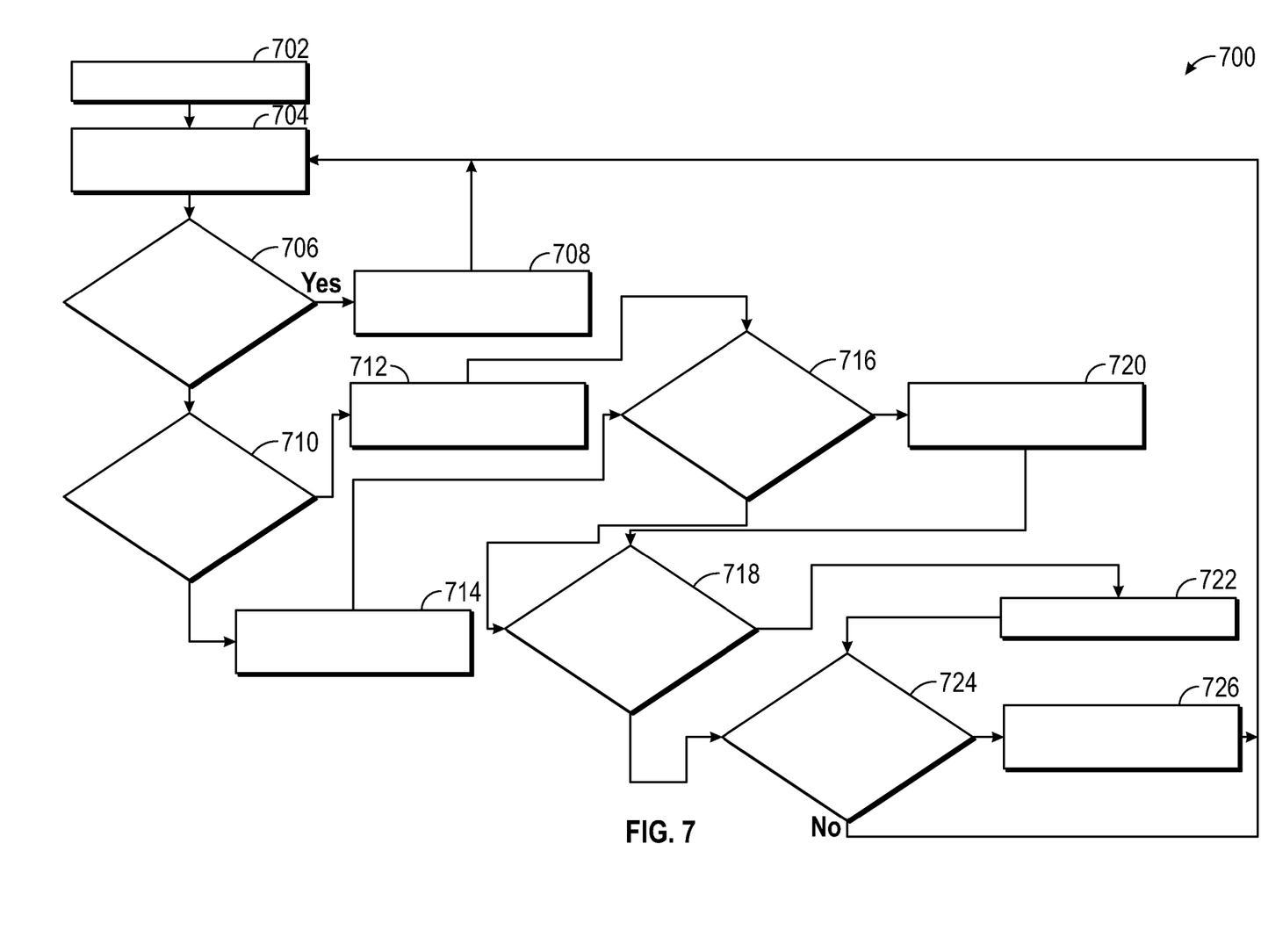
FIG. 7 illustrates a method of operating a multi-functional controller according to an aspect of the present disclosure.

With reference to FIGS. 1 through 6, a method of operating the system using the multi-functional control 200 is illustrated in FIG. 7, wherein the multi-functional control 200 controls the HVAC system. The method 700 begins at block 702 with the user entering the cabin 304 of the vehicle 302. At block 704, the user desires to adjust the HVAC settings. At block 706, a determination is made by the user as to whether the HVAC should be placed in auto-control mode. If auto-control mode is desired, then at block 708, the user pushed down the stacked knobs 202 activating the push button to select auto-control mode. If, at block 706, the user does not want to place the HVAC in auto-mode, then at 710 a determination is made as to whether the user prefers to adjust personal zone settings, such as driver side or passenger side settings. If the user prefers to adjust the HVAC settings in a particular zone, i.e., the driver or passenger side, at block 712, the user selects the zone by using the sliding sensor 222 and slides the stacked knobs 202 towards the desired zone of the vehicle 302. After the passage of a given time period after an adjustment is made, the stacked knobs 202 will return to the center of the sliding sensor 222. If it is not desired to adjust a given zone, then at block 714, the user maintains the stacked knobs 202 in the center of the sliding sensor 222.

At block 716, a determination is made as to whether the user may want to adjust the zone or cabin 304 temperature. If at block 716 there is no desire by the user to adjust the temperature, then a determination is made as to whether the user would like to adjust fan speed at block 718. If at block 716 the user does want to adjust the temperature, then at block 720, the user rotates the one of the two stacked knobs 202a, 202b. As noted, the distinction between which of the knobs 202a, 202b the user desires to interact with is determined based on the touch sensor 206a, 206b is activated.

At block 718, a determination is made as to whether the user would like to adjust fan speed. If a determination is made that the user would like to adjust fan speed, then at block 722 the user rotates the other of the two stacked knobs 202a, 202b. If there is no desire to adjust fan speed, then at block 724, a determination is made as to whether the user wants to adjust airflow direction. If it is desired to adjust airflow direction, then at block 726, the user tilts the stacked knobs up and down activating the rocker switch 228. If there is no desire to adjust airflow direction, or the method progresses to block 704 when a decision is again made by user to adjust the HVAC system. An additional step may also include toggling between the front and rear of the cabin using the independently packaged control 230. It should be appreciated that the above method and control system are discussed with reference to an HVAC system. However, as alluded to above, the multi-functional control 200 may be used to control other systems such as the seating systems, the infotainment systems, etc.

Figure 8:
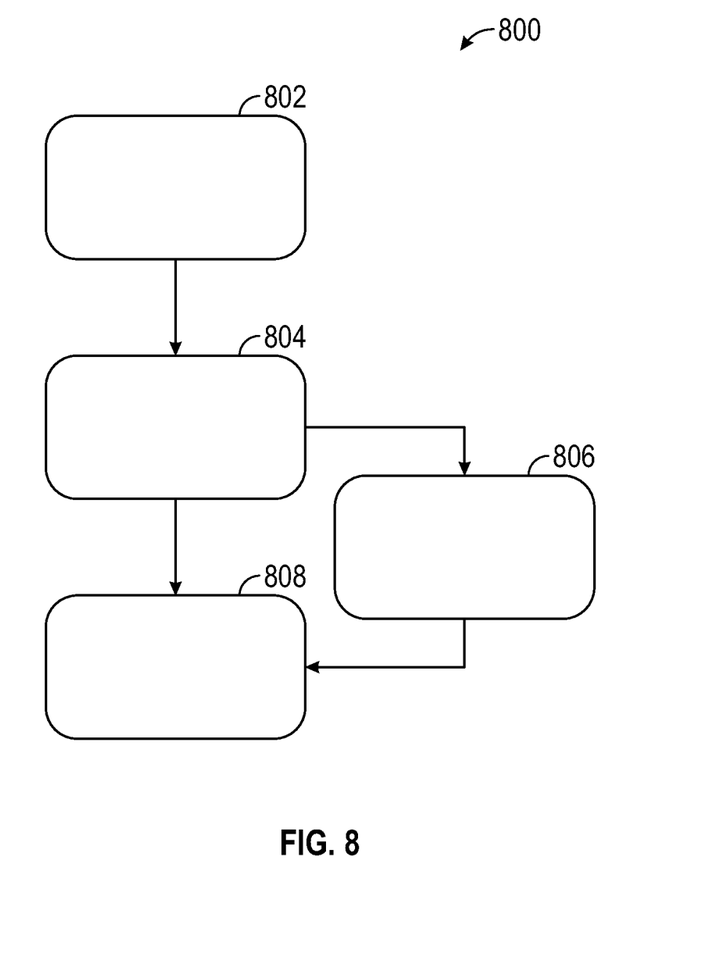
FIG. 8 illustrates a method of operating a multi-functional controller according to an aspect of the present disclosure.

FIG. 8 illustrates a series of instructions 800 the on-board processor 320 is configured to execute for altering one of a plurality of devices 334 in a vehicle system 300 using the multi-functional control 200, according to any of the aspects described above and with further reference to FIGS. 2 through 6. The instructions 800 include, at block 802, detecting a manipulation of the multi-functional control 200 by receiving a signal from at least one of a plurality of sensors in the multi-functional control 200. Depending on which sensor is activated, at block 804, the method includes determining how the multi-functional control has been manipulated or the degree to which the multi-functional control has been manipulated. For example, if the stacked knobs 202 are tilted, the method includes determining the direction of tilt with the rocker switch 228. In another optional example, if the push-button switch 236 connected to the stacked knobs 202 is activated, or the stacked knobs 202 are displaced in the sliding sensor 222, the method includes adjusting which of the plurality of devices 334 the manipulation of the multi-functional control 200 is being applied to. In yet a further example, if at least one of the display knob 202a and base knob 202b are being rotated, the method further includes determining the degree of rotation applied to the knob 202a, 202b. In addition, the instructions 800 also include assigning the manipulation of both stacked knobs 202 to the base knob 202b when it is detected that both the display knob 202a and the base knob 202b are being manipulated at block 806.

Once a determination is made that the multi-functional control 200 has been manipulated, then the on-board processor is configured to adjust one of the plurality of devices 334 associated with the manipulation of the multi-functional control 200 at block 808. As noted above, in the case of an HVAC system, the plurality of devices 334 include a heater, an air conditioner, a blower motor, and an actuator. In the case of an infotainment system, the plurality of devices may include the volume control, the station selection, the data input (i.e., radio, USB, BLUETOOTH, etc.). In the case of a seat system, the plurality of devices may include seat motors for controlling seat height, angle, forward position, back position, lumbar position, etc.

The multi-functional control, system and methods of the present disclosure offer several advantages. These advantages may include the ability to effectively reduce the total packaging size for multiple controls. In addition, these advantages include offering a reduction in the footprint of multiple controls, increased functionality, and reduced complexity of use as the user only needs to locate one, maybe two controls to operate the system. A further advantage includes the ability to controlling other vehicle features, such as the infotainment system controls or seat positioning controls.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A multi-functional control for a vehicle, comprising:
a base plate including a slot;
a post extending through the slot in the base plate;
at least two stacked knobs, rotatably and tilt-ably attached to the post, wherein the stacked knobs include a display knob and a base knob;
a plurality of sensors including a first touch sensor integrated in the display knob, a second touch sensor integrated in the base knob, a first rotary sensor integrated in the display knob, a second rotary sensor integrated in the base knob, a rocker switch connected to the stacked knobs, and a push-button switch connected to the stacked knobs; and
a sliding sensor, wherein the post and stacked knobs are mounted to the sliding sensor.

2. The multi-functional control of claim 1, further comprising:
an on-board processor connected to the multi-functional control; and
a plurality of devices connected to the on-board processor.

3. The multi-functional control of claim 2, further comprising: a system controller connecting the plurality of devices to the on-board processor.

4. The multi-functional control of claim 2, further comprising an independently packaged control connected to the on-board processor.

5. The multi-functional control of claim 2, wherein the plurality of devices includes a heater, an air conditioner, a fan, and a blend door motor.

6. The multi-functional control of claim 5, further comprising an air duct fluidly connected to a vehicle cabin including the multi-functional control, wherein the plurality of devices is operatively coupled to the air duct.

7. The multi-functional control of claim 6, further comprising a temperature sensor connected to the on-board processor, wherein the temperature sensor is operatively coupled to the vehicle cabin.

8. The multi-functional control of claim 7, further including an independently packaged control connected to the on-board processor.

9. The multi-functional control of claim 1, wherein the first touch sensor and the second touch sensor each include at least one of a capacitive sensor and a resistive sensor.

10. The multi-functional control of claim 1, wherein the first rotary sensor and the second rotary sensor each include at least one of a rotary potentiometer and a rotary encoder.

11. The multi-functional control of claim 1, wherein the sliding sensor includes at least one of a slide potentiometer and a linear variable differential transformer.

12. The multi-functional control of claim 1, wherein the display knob includes a display.

13. A control system for a vehicle, the control system comprising:
a multi-functional control including:
a base plate including a slot,
a post extending through the slot in the base plate,
at least two stacked knobs, rotatably and tilt-ably attached to the post, wherein the stacked knobs include a display knob and a base knob,
a plurality of sensors including a first touch sensor integrated in the display knob, a second touch sensor integrated in the base knob, a first rotary sensor integrated in the display knob, a second rotary sensor integrated in the base knob, a rocker switch connected to the stacked knobs, and a push-button switch connected to the stacked knobs, and
a sliding sensor, wherein the post and stacked knobs are mounted to the sliding sensor; and
an on-board processor in communication with the plurality of sensors, wherein the on-board processor is configured to:
detect a manipulation of the multi-functional control by at least one of the plurality of sensors; and
adjust one of a plurality of devices associated with the detected manipulation of the multi-functional control.

14. The control system of claim 13, wherein the system further comprises an independently packaged switch and the on-board processor is configured to: determine a state of the switch and adjust at least a portion of the plurality of devices the manipulation of the multi-functional control is associated with.

15. A method of controlling a system in a vehicle, comprising:
detecting by at least one of a plurality of sensors a manipulation of a multi-functional control, the multi-functional control including:
a base plate including a slot,
a post extending through the slot in the base plate,
at least two stacked knobs, rotatably and tilt-ably attached to the post, wherein the stacked knobs include a display knob, a base knob, and
a plurality of sensors including a first touch sensor integrated in the display knob, a second touch sensor integrated in the base knob, a first rotary sensor integrated in the display knob, a second rotary sensor integrated in the base knob, a rocker switch connected to the stacked knobs, and a push-button switch connected to the stacked knobs, and
a sliding sensor, wherein the sliding sensor is one of the plurality of sensors and wherein the post and stacked knobs are mounted to the sliding sensor; and
adjusting one of a plurality of devices in a system based on the detected manipulation of the multi-functional control.

16. The method of claim 15, further comprising: identifying which of the display knob and base knob are being rotated.

17. The method of claim 16, further comprising: determining both the display knob and the base knob are being manipulated and assigning the manipulation to the base knob.

18. The method of claim 15, further comprising detecting tilting of the stacked knobs to activate the rocker switch.

19. The method of claim 15, further comprising detecting a state of the push-button switch.

20. The method of claim 15, wherein the system is an HVAC system and the plurality of devices include a heater, an air conditioner, a blower motor, an actuator and adjusting one of a plurality of devices includes adjusting one of the heater, the air conditioner, the blower motor, and the actuator.

\* \* \* \* \*